United States Patent [19]

Goss et al.

[11] Patent Number: 4,662,751

[45] Date of Patent: May 5, 1987

[54] CLOSED LOOP FIBER OPTIC ROTATION SENSOR

[75] Inventors: Willis C. Goss, Altadena; Bruce R. Youmans, Temple City; Noble M. Nerheim, Arcadia; Randall K. Bartman, Pasadena, all of Calif.

[73] Assignee: The United States of America as represented by the Administrator of the National Aeronautics and Space Administration, Washington, D.C.

[21] Appl. No.: 779,744

[22] Filed: Sep. 24, 1985

[51] Int. Cl.$^4$ .............................................. G01B 9/02
[52] U.S. Cl. ............................. 356/350; 250/231 GY
[58] Field of Search ............. 250/231 GY; 350/96.11, 350/96.13, 96.14; 356/349, 350

[56] References Cited

U.S. PATENT DOCUMENTS

| 3,512,890 | 5/1970 | McLaughlin | 356/350 |
|---|---|---|---|
| 3,877,813 | 4/1975 | Hayes et al. | 356/350 |
| 4,135,822 | 1/1979 | Ezekiel | 356/350 |
| 4,138,196 | 2/1979 | Redman | 356/350 |
| 4,208,128 | 6/1980 | Thompson et al. | 356/350 |
| 4,265,541 | 5/1981 | Leclerc et al. | 356/350 |
| 4,273,444 | 6/1981 | Pool et al. | 356/350 |
| 4,273,445 | 6/1981 | Thompson et al. | 356/350 |
| 4,299,490 | 11/1981 | Cahill et al. | 356/350 |
| 4,315,693 | 2/1982 | Walker | 356/350 |
| 4,372,685 | 2/1983 | Ulrich | 356/350 |
| 4,408,882 | 10/1983 | Sheem | 356/350 |
| 4,420,259 | 12/1983 | Taylor | 356/350 |
| 4,440,498 | 4/1984 | Sheem | 356/350 |
| 4,486,657 | 12/1984 | Bush | 356/349 X |

FOREIGN PATENT DOCUMENTS

3104786  9/1982  Fed. Rep. of Germany ... 356/350 X

Primary Examiner—Eugene R. LaRoche
Assistant Examiner—Steven J. Mottola
Attorney, Agent, or Firm—Paul F. McCaul; Thomas H. Jones; John R. Manning

[57] ABSTRACT

An improved optical gyroscope is provided, of the type that passes two light components in opposite directions through an optic fiber coil, and which adds a small variable frequency to one of the light components to cancel the phase shift due to rotation of the coil. The amount of coil rotation from an initial orientation, is accurately determined by combining the two light components, one of which has a slightly increased frequency, to develop beats that each represent a predetermined angle of rotation. The direction of rotation is obtained by combining the two light components on a photodetector, intermittently phase shifting a single light component by 90°, and comparing the direction of change of photodetector output (+ or −) caused by the 90° shift, with the slope (+ or −) of the photodetector output at about the same time, when there is a 90° shift.

8 Claims, 11 Drawing Figures

FIG. 1
PRIOR ART

FIG. 2
LIGHT INTENSITY

CLOSED LOOP FIBER OPTIC ROTATION SENSOR

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

In an early form of optical fiber gyroscope, a light beam is split into two components that pass in opposite directions through an optical fiber sensing coil. The component that passes in the direction of rotation of the coil takes a longer time to traverse the coil and is delayed in phase with respect to the other component. The two light components are combined again on a photodetector, and produce an amount of light dependent upon their phase difference, which is dependent upon rate of rotation of the coil. In a more advanced, phase nulling optical gyroscope, a small additional frequency is added to or subtracted from one of the light components. After traversing the coil, both light components at corresponding ends of the coil, have a predetermined constant phase relationship regardless of the rate of rotation of the coil because of the frequency shift. A ramp voltage applied to a phase shifter creates the additional frequency, and the slope of the ramp and the frequency of its resetting indicate the amount of increased frequency that had to be added to or subtracted from one light component, and therefore indicate the rate of rotation of the coil.

The detection of coil rotation can be a problem when the rotation rate is very small. A very small rotation is common, as where the vehicle on which the optical gyroscope is mounted maintains an essentially fixed orientation along a flight path. Then the ramp may have a very low resetting rate. Furthermore, the phase shifter to which the ramp voltage is applied, may not have a linear relationship between the rate of voltage increase and the frequency change. An apparatus which could produce a more precise and accurate indication of coil rotation, and in a digital form, especially for very low rates of coil rotation, would be of considerable value.

SUMMARY OF THE INVENTION

In accordance with one embodiment of the present invention, a phase nulling optical gyroscope is provided which produces a digital output which precisely indicates the amount of rotation and rotation rate. The optical gyroscope includes means for combining one light component of a split beam with another light component that has undergone a frequency shift, to produce an optical beat frequency indicating a difference in their frequencies, which is proportional to the rotation rate of the sensing coil of the gyroscope. The direction of rotation can be determined by intermittently phase shifting one of the components by 90° and comparing the output of a photodetector before and after the phase shift.

The novel features of the invention are set forth with particularity in the appended claims. The invention will be best understood from the following description when read in conjunction with the accompanying drawings.

DESCRIPTION OF THE PREFERRED EMBODIMENT

Figures 1, 2, 3:
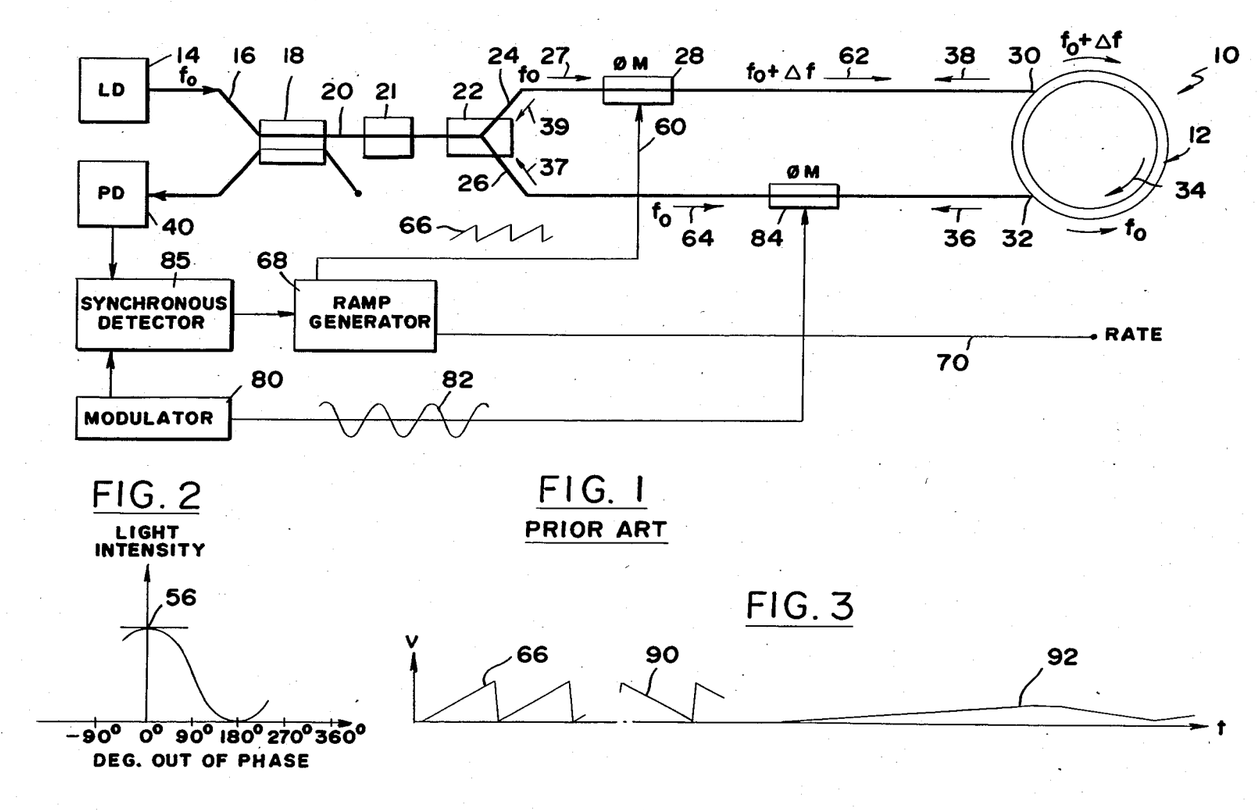
FIG. 1 is a diagram of an optical gyroscope of the prior art, over which the gyroscope of the present invention is an improvement.
FIG. 2 is a graph showing variation in light intensity with difference in phase of two light components in the gyroscope of FIG. 1.
FIG. 3 is a graph showing variation in voltage output of the ramp generator of FIG. 1, under various conditions of rotation of the sensing coil.

FIG. 1 illustrates a prior art optical gyroscope 10 which uses an optical fiber sensing coil 12. Coherent light from a source such as a laser diode 14 of a mean frequency $f_o$, is delivered over a line or optical waveguide 16 to a first beamsplitter 18. Half of the input from waveguide 16 is delivered as an output on waveguide 20 from the first beamsplitter, to a polarizer 21 and second beamsplitter 22. Two optical lines 24, 26 leading from the second beamsplitter, each carry an equal portion of the light delivered over waveguide 20 to the second beamsplitter. The two beam components 27, 64 on waveguide 24, 26 enter opposite ends 30, 32 of the sensing coil 12. In the following discussion we will ignore phase shifters 28, 84 for the moment.

The sensing coil comprises a long optical fiber of a length of perhaps 3 kilometers wound into a coil. If the coil is turning in the direction of arrow 34, then the light component entering the end 32 will exit the end 30 in less time than it takes for the light component traveling in the opposite direction to exit the end 32. Thus, the returned light component at 38 will be advanced in phase from the other light component indicated at 36. The two light components at 37, 39 are combined together by the second beamsplitter 22 and then pass along waveguide 20 to the first beamsplitter 18. At the first beamsplitter 18 a portion of the combined light components is directed onto a photodetector 40.

The amount of light falling on the photodetector 40 depends upon the relative phases of the two light components. FIG. 2 includes a graph 54 which illustrates the variation of light on the photodetector 40 as a function of the degrees out of phase of the two returned light components 36, 38. If the two components are in phase, the light is of maximum intensity, while if they are 180° out of phase the light intensity is minimal. It would be possible to determine an approximate although ambiguous rate of rotation of the sensing coil 12 by measuring the relative light intensity on the photodetector 40. However, it is more accurate and unambiguous to keep track of coil rotation by nulling the system; that is, by altering the phase of one of the light components so that it is always in a predetermined relationship to the other light component, and the amount of light falling on the photodetector is always close to a particular level such as the level indicated at 56 in FIG. 2.

The phase of the light component passing along the waveguide 24, is altered by a phase or frequency shifter 28. The phase shifter 28 is driven by voltage on an input line 60. If a constant phase shift were to be created by the phase shifter 28, then it would be self defeating because both light components would pass through the phase shifter and undergo the same additional phase shift. To induce a greater phase shift for one light component 62 passing in one direction through the phase shifter 28, which is more than the other light component 64, the phase shifter 28 is operated to constantly increase (or decrease) the phase of the light component 62, by delivering a ramp voltage, indicated at 66, to the phase shifter 28. The ramp voltage produces a constantly increasing phase shift, which is the equivalent of increasing the frequency of the component 62. Thus, while the light component 27 on line 24 has a frequency of $f_o$, the light component 62 exiting from the phase shifter 28 and passing through the coil has a frequency of $f_o$ plus $\Delta f$ the other light component 64 does not undergo a frequency shift of $\Delta f$ until, at 38, it has passed through the coil and encounters phase shifter 28. Both light components at 37, 39 have the same frequency when combined at detector 40.

The frequency shift $\Delta f$ times the transit time through the sensing coil 12, results in a phase shift $\Delta \Phi$ for light component 36 which exits the coil. The amount of phase shift $\Delta \Phi$ is made just enough by controlling $\Delta f$) to offset the phase shift caused by rotation of the sensing coil 12, so the two returned light components directed onto the photodetector 40 are at a constant phase relationship which produces the light level indicated at 56 (FIG. 2).

The ramp voltage 66 is produced by a ramp generator 68. Because the voltage output of the generator 68 cannot continue to increase indefinitely, the voltage is reset every time the voltage level reaches a predetermined voltage limit. If the slope of the ramp voltage 66 is proportional to the frequency change $\Delta f$, and is also proportional to the repetition rate of the resettings of the ramp voltage, it is possible to determine the approximate rate of rotation of the sensing coil by the rate of resetting of the ramp generator 68. An output line 70 from the ramp generator carries signals indicating the rotation rate of the sensing coil. It may be noted that the circuit also includes a modulator 80 which generates an output 82 of a predetermined frequency such as 30 kHz which it delivers to a phase modulator 84. The variation of the phase of signals passing therethrough results in the light falling on the photodetector 40 varying in intensity at 30 kHz. The result is an AC signal whose amplitude is detected with synchronous detector 85. This eliminates noise problems associated with DC detection.

When the sensing coil 12 is rotating rapidly, the output on line 70 indicating the ramp reset rate and hence the rotation rate of the coil provides an approximately proportional output. However, in many applications the sensing coil 12 rotates extremely slowly. In one type of situation, the sensing coil 12 is on a moving vehicle, and when the vehicle maintains an essentially fixed orientation along a flight path the rate of rotation of the sensing coil is very small. Furthermore, the rotation may repeatedly reverse direction. FIG. 3 illustrates three forms of ramp output 66, 90, and 92. The ramp output 66 represents the output when the coil sensing 12 is turning in one direction. The ramp output 90 represents the output of the ramp generator 68 when the sensing coil is rotating in the opposite direction. The ramp output 92 represents the output of the ramp generator when the sensing coil is rotating very slowly and reverses direction before resetting of the ramp. In that case, knowledge about the rate of resetting of the ramp generator does not aid in determining slow rotation of the coil. It is possible to approximately determine slow rotation of the sensing coil by sensing the slope of the ramp output 92. However, it is difficult to obtain an analog-to-digital converter with sufficient resolution to obtain both the ramp and the sensitivity of output required for operation at both high and low rates. Furthermore, the phase shifter 28 does not have an accurately linear relationship between the phase shift and the voltage applied. Accordingly, gyroscopes of the type shown in FIG. 1 can exhibit considerable scale factor error.

Figures 4, 4A:
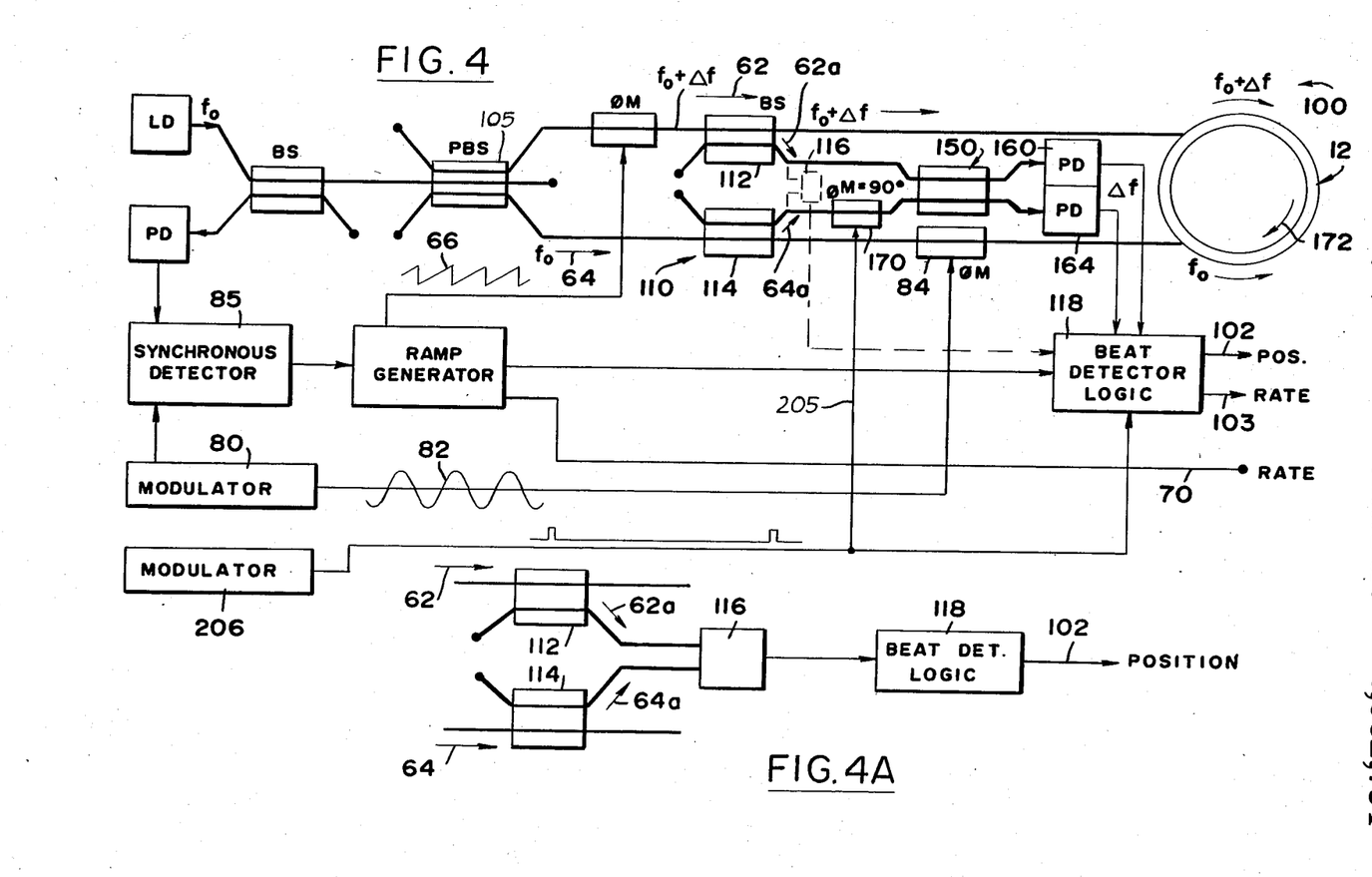
FIG. 4 is a diagram of an optical gyroscope constructed in accordance with the present invention.
FIG. 4A shows a simplified embodiment of the beat detection circuitry of FIG. 4.

FIG. 4 illustrates an optical gyroscope 100 of the present invention, which provides a digital output that accurately indicates rotation of the sensing coil, with an output 102 that provides signals indicating minute incremental changes in the angular position of the sensing coil. This is in addition to output lines 70, 103 which each indicate the rate of rotation of the coil. The apparatus 100 is similar to that of FIG. 1, except for the addition of a means 110 for directing the two light components 62, 64 to a 3 dB beamsplitter 150 to obtain an optical beat frequency. This optical beat frequency can be detected by one or more photodetectors 160, 164. Also, the polarizing and beam-splitting is accomplished in a polarizing beamsplitter 105 of the type described in "Optical Waveguide 3×3 Switch: Theory of Tuning and Control," by H. Ogiwara, Applied Optics, Vol. 18, No. 4, 1979.

In its simplest form, the directing means 110 can include two beamsplitters 112, 114 which split each light component 62, 64 to derive a corresponding light subcomponent 62a, 64a which is the same as the light component except that it has about one-tenth the amplitude.

As shown in FIG. 4A, the two light subcomponents 62a, 64a may be directed onto a photodetector 116. For one direction of coil rotation, the light subcomponent 62a is at a higher frequency than the other light component 64a. The difference in frequency of 62a and 64a results in an optical beat frequency which is detected by photodetector 116. The output of the photodetector 116 is delivered to a beat detector logic circuit 118. Every time the output of the photodetector 116 passes through a predetermined level, the beat detector circuit 118 generates a pulse on its output 102. For a typical sensing coil with light passing therethrough, and with the sensing coil having a length of a few kilometers and a diameter of perhaps 15 centimeters, the beat frequency represents a few arc seconds of rotation per beat (per cycle of $\Delta f$). However, this simplified detection has the disadvantage that it does not determine direction of rotation. The circuit 110 shown in solid lines in FIG. 4 and also in FIG. 5 allows this.

Figure 6:
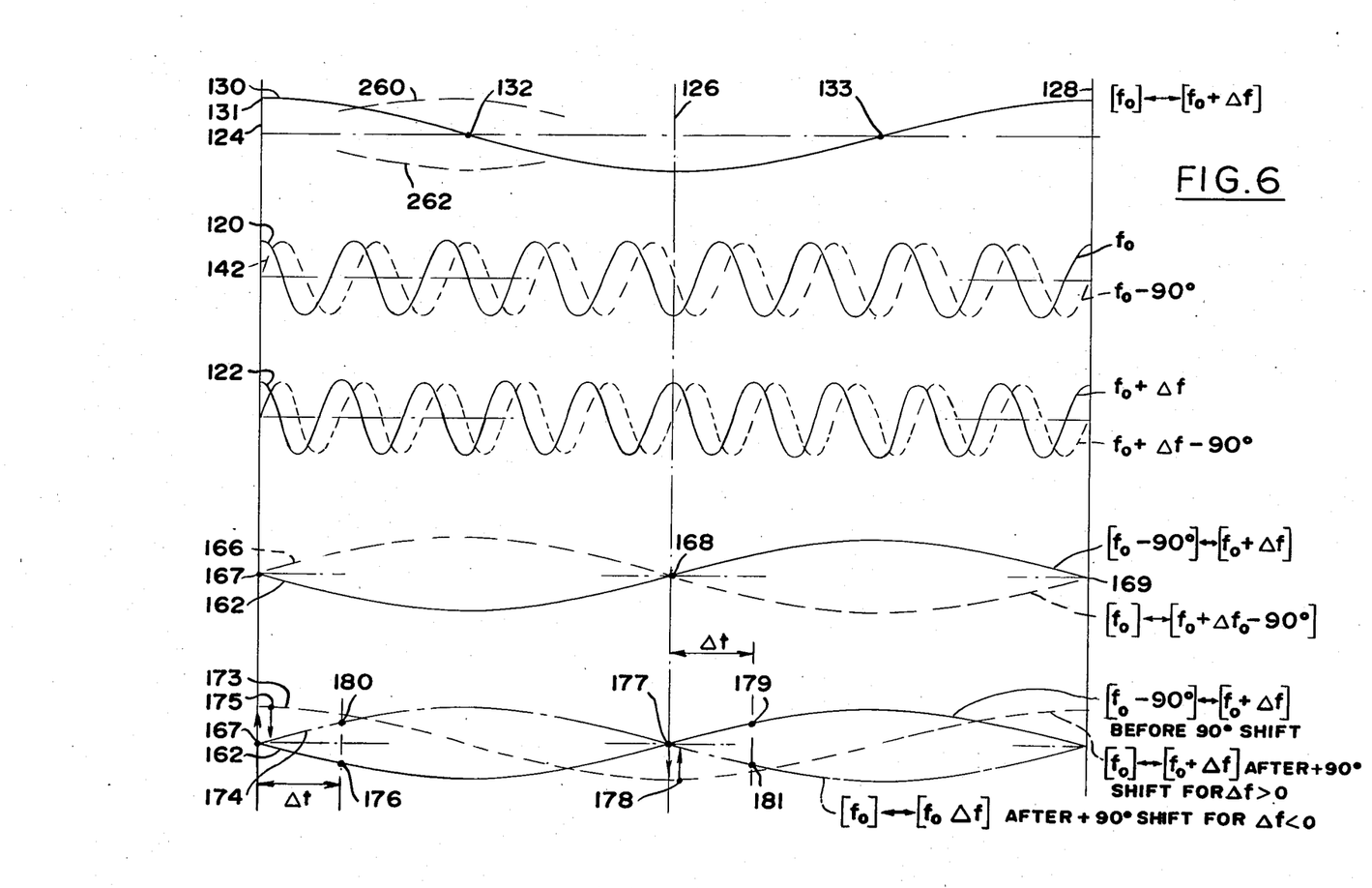
FIG. 6 comprises a group of graphs showing variations in light intensity with time in the optical beat detection circuitry of the invention.

FIG. 6 includes two curves or graphs 120, 122 representing the variation of amplitude of the light subcomponents 64a and 62a, respectively. (The graphs are shown for Δf being positive.) It can be seen that the two curves 120, 122 are in phase at the point in time indicated by line 124 are 180° out of phase at 126, and are back in phase at 128. The curve 130 indicates the light intensity on the photodetector 116 when the two light subcomponents 62a, 64a (curves 120, 122) are combined and directed onto the photodetector 116. When the two waves are in phase at 124 and 128, the level of curve 130 is maximum, and when they are out of phase at 126, the level of curve 130 is minimum. Every time a predetermined level is passed, a beat is developed. When a maximum at 131 is detected, the frequency of the beats equals the frequency Δf, while if the mid level at 132, 133 is detected the beat frequency equals 2 Δf.

Figure 5:
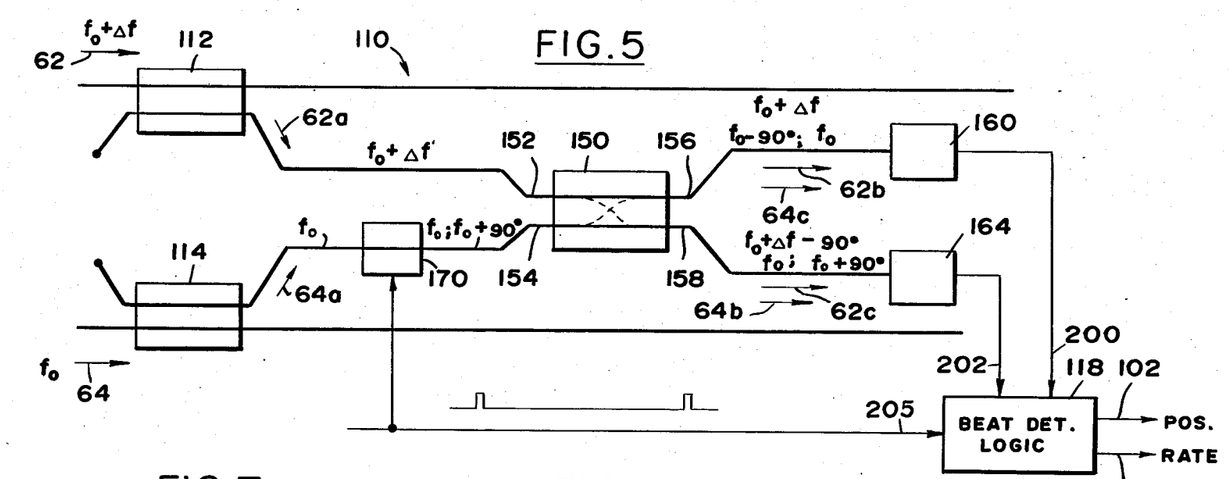
FIG. 5 is a view of a portion of FIG. 4 showing the optical beat detection circuitry thereof.

The present invention further refines the means for optical beat detection. As shown in FIG. 5, applicant can direct the two subcomponents 62a, 64a through a 3 dB beamsplitter 150 which has two inputs 152, 154 and two outputs 156, 158. Each subcomponent 62a and 64a is divided into two equal parts which exit on outputs 156, 158. The subcomponent part 62b on output 156 is not shifted in phase and may be represented as $f_o + \Delta f$. The subcomponent part 64c on output 156 is shifted by $-90°$ from part 64a, so 64c may be represented as $f_o - 90°$ ($f_o$ phase shifted by $-90°$). In a similar manner, the subcomponent part 62c exiting output 158 is shifted by $-90°$, but the part 64b is not shifted. The two parts on output 156, which are $f_o + \Delta f$ and $f_o - 90°$, are both directed onto a photodetector 160 where they develop a beat frequency. In FIG. 6, the curve 162 represents the light level, or electrical output, on or from photodetector 160. In a similar manner, the light on output 158 consists of the subcomponent parts $f_o + \Delta f - 90°$ and $f_o$ which enter another photodetector 164 to produce an interference light level indicated by curve 166 in FIG. 6. The outputs of the two photodetectors 160, 164 are delivered to the beat detector logic circuit 118.

It can be seen in FIG. 6, that the two curves 162, 166 representing light falling on the two photodetectors 160, 164, are of the same level at the points 167, 168 and 169. In between these points, the curves 162, 166 are at very different levels. By comparing the two curves 162, 166, or in other words the electrical outputs from the two photodetectors 160, 164, applicant can more easily determine the optical beat frequency. Every time the outputs of the two photodetectors are equal, as at points 167, 168, applicant records an electrical beat. The electrical beat frequency will be 2 Δf, i.e., twice the optical beat frequency. This way of determining the optical beat frequency has the advantage that it avoids errors which can result from variations in the average light intensity of the beam components. However, the beat frequency Δf can be determined using only photodetector 160 or 164.

Applicant is able to determine the direction of rotation of the sensing coil by intermittently operating a 90° phase shifter 170 (FIG. 5) which shifts subcomponent 64a by $+90°$, i.e., the output from the phase shifter is $f_o + 90°$. By comparing the output of one of the photodetectors such as 160 before and after a $+90°$ phase shift by the phase shifter 170, applicant is able to determine whether the sensing coil (12 in FIG. 4) is rotating in the direction of arrow 172 (in which case Δf is positive) or is rotating in an opposite direction (in which case Δf is negative). The beat detector logic circuit 118 compares the output of one of the photodetectors such as 160 (or 164) at three points: (1) arbitrary time t and 0° phase shift by phase shifter 170, (2) time t and $+90°$ phase shift by phase shifter 170, and (3) time t plus a delay Δt, and 0° phase shift by phase shifter 170.

FIG. 6 includes three graphs 162, 173 and 174 showing the outputs of the photodetector 160 under three conditions. Graph 162 shows the output for Δf positive (coil rotates in clockwise direction 172 in FIG. 4) and 0° phase shift by phase shifter 170. Graph 174 shows the output for Δf negative (coil rotates counterclockwise) and 0° phase shift by phase shifter 170. Graph 173 shows the output for Δf either positive or negative and a $+90°$ phase shift by phase shifter 170.

An example, where Δf is positive will now be given, to show how this fact (Δf is positive) is determined. The output of photodetector 160 reaches a mid-level crossing of graph 162, such as point 167. A 90° phase shift is then generated by phase shifter 170, which shifts the light intensity to point 175 on graph 173, at which instant the AC output (i.e. that with the mid-level subtracted out) of the photodetector is positive. The phase shifter is immediately returned to 0° shift and the AC photodetector output falls back to about zero. After a time delay Δt, the light intensity is at point 176 on graph 162. The AC output of the photodetector is again measured and is found to be negative. The fact that the AC output changes in sign, first being positive (during the 90° shift) and then being negative (at 0° phase shift and after a delay Δt), indicates that Δf is positive. If the zero crossing were a half wave later, at the point 177 on graph 162, then after the 90° phase shift the AC output of the photodetector would be negative at point 178, and after return to graph 162 and a delay the output would be positive at point 179.

In another example, Δf is negative and the light intensity on photodetector 160 is as shown in graph 174. Again, an AC zero crossing is detected at point 167. A $+90°$ phase shift by phase shifter 170 again shifts the light intensity at point 175 on graph 173, and the AC output is again found to be positive. The phase shifter is immediately returned to 0° shift, the AC output of photodetector 160 again returning to about zero. After a time delay Δt, the light intensity is at point 180 on graph 174. The AC output of the photodetector is measured and found to be positive. The fact that the AC output does not change sign in going from point 175 to 180 indicates that Δf is negative. A similar situation and result prevails with respect to points, 177, 178 and 181.

The above method and results were specialized to points identifiable as AC zero crossings on graphs 162 and 174. It is to be stressed, however, that the same method, involving detecting the signs of the AC level during a 90° phase shift and the slope of the 0° shift curve, may be applied at arbitrary points in time to yield the same results.

Figure 7:
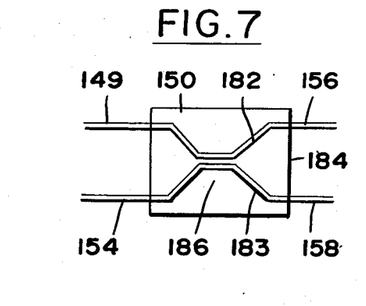
FIG. 7 is a plan view of a beamsplitter of the circuit of FIG. 5.

FIG. 7 illustrates the construction of the beam-splitter 150. A pair of light wave channels 182, 183 are located in a substrate 184 of lithium niobate. At the region 186, the two waveguides are close together, and part of the light passing through one of them such as 182 will transfer to the other 183 and undergo a $-90°$ phase shift. The closeness and length of the region 186 determines the proportion of light that will transfer, and the device 150 is constructed so one half of the light on each waveguide 182 will transfer to the other such as 183.

Figure 8:
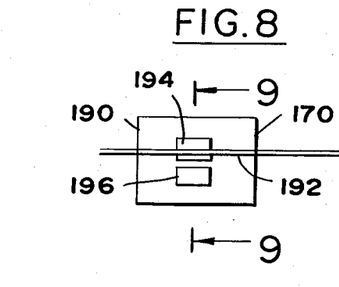
FIG. 8 is a plan view of a 90° phase shifter of the circuit of FIG. 5.
Figure 9:
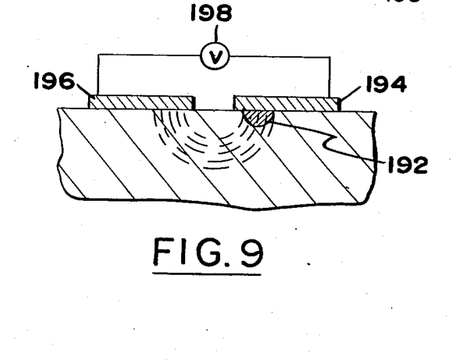
FIG. 9 is a view taken on the line 9—9 of FIG. 8.

The 90° phase shifter 170 has the construction shown in FIGS. 8 and 9. An optical waveguide 192 formed in a substrate 190 extends along its length. A pair of electrodes 194, 196 lie on the surface of the substrate. When a voltage from a source 198 is applied between the electrodes 194, 196, an electric field is established which passes vertically through the optical waveguide 192. This causes a 90° phase shift in light passing through the optical waveguide. Whether the shift is +90° or −90° depends upon the direction of the bias voltage 198.

The beat detector logic circuit 118 (FIG. 5) includes inputs 200, 202 from the photodetectors 160, 164. As shown in the simplified block diagram of FIG. 10, the beat detector circuit 118 includes an analog comparator 208 which continuously compares the outputs 200, 202 of the two photodetectors 160, 164. The output 204 from the comparator is a series of pulses which are generated every time the ac outputs on the two lines 200, 202 are equal. The output on line 204 has a frequency equal to 2 $\Delta f$.

Figure 10:
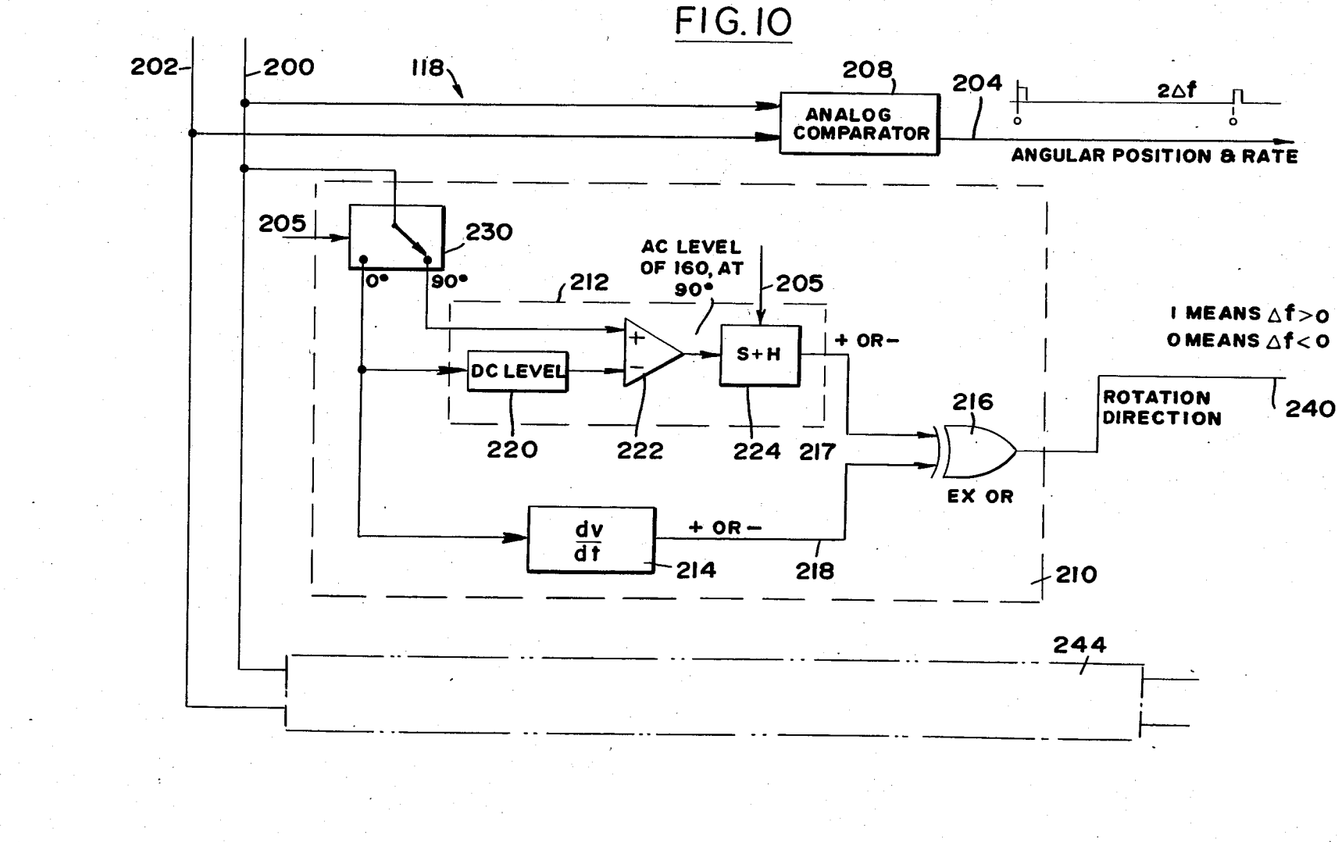
FIG. 10 is a block diagram showing an implementation of the optical beat detector logic of FIG. 5.

The output on line 200 is also delivered to a circuit 210 which determines direction of rotation of the sensing coil. This circuit consists of three basic parts. A first part 212 determines the sign of the 90° phase shifted AC signal discussed above and represented by curve 173. A second part 214 is a slope detector which determines the sign of the slope of the 0° phase shifted signal discussed above and represented by curve 162 ($\Delta f$ positive) or curve 174 ($\Delta f$ negative). A third part is an exclusive-or gate 216 which compares the outputs 217, 218 of parts 212 and 214 and thereby establishes direction of rotation. Again, if the outputs of 212 and 214 are of the same sign, then for the implemention discussed above $\Delta f$ is negative and the coil is rotating counterclockwise; on the other hand, if the outputs 217, 218 are of opposite sign, $\Delta f$ is positive and the coil is rotating clockwise.

The part 212 may be implemented by means of a DC level memory 220, a differential amplifier or comparator 222, and a sample-and-hold circuit 224. A switch 230 has two positions, appropriate to either a 0° or 90° phase shift. It is normally in the 0° position. However, when the phase shifter 170 is switched to its 90° phase shift level by modulator 206, the signal 205 from the modulator also throws switch 230 to its 90° position. The 90° phase shifted reading of photodetector 160 now appears at the + terminal of comparator 222, where it is compared with the DC level stored in memory 220. The output of the comparator 222 during this time will thus represent the AC level of the 90° phase-shifted curve 173 (at, perhaps 175). The signal 205 from the modulator gates the sample-and-hold circuit 224 during this time, storing this 90° phase shifted value therewithin. The output of the sample-and-hold circuit 224 may then be reduced, either internally or at the input to the exclusive-or gate 216, to a simple indication of the algebraic sign (plus or minus) of curve 173 at a time or point such as 175.

The slope detector 214 simply determines the slope of whichever curve, 162 or 174, is appropriate to the coil's current state of rotation. The slope detector may, for instance, be implemented by means of a simple linear differentiator circuit. Again, the output of slope detector 214 is reduced to a simple indication of the algebraic sign (plus or minus) of the slope of curve 162 or curve 174 at the time or point such as 167.

The algebraic sign outputs of 217 and 218 are then compared by Exclusive-OR gate 216. The results of this comparison indicate whether $\Delta f$ is positive (clockwise rotation), when 217 and 218 are of opposite algebraic sign, or $\Delta f$ is negative (counterclockwise rotation), when 217 and 218 are of the same algebraic sign. The detector circuit 118 in FIG. 10 can include another direction of rotation circuit 244 which duplicates the rest of the circuit, except for the analog comparator 208. The circuit 244 serves as a backup, in the event of failure of the other direction-of-rotation circuit.

Thus, the invention provides an optical gyroscope of the phase nulling type, which enables an accurate determination of changes of rotational position of the gyroscope. This is accomplished by directly (i.e. optically) comparing an original frequency $f_o$ with a nulling frequency $f_o + \Delta f$ required to null the system.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In an optical gyroscope which includes means for deriving a pair of light components of a coherent light beam and passing them in opposite directions around an optic fiber loop, said deriving means including a frequency shifter on a first side of the optic fiber loop that produces a frequency shift in light passing therethrough, in an amount that cancels the relative phase shift of the light components arising from rotation of the optic fiber loop, the improvement of means for detecting the frequency shift which produced the cancellation comprising:

a photodetector; and means for combining onto said photodetector, light from opposite sides of said optic fiber loop, including light on said first side that has passed through said frequency shifter but not said loop, and light on the other side which has not passed through said frequency shifter or said loop.

2. An optical gyroscope comprising:

a source of coherent light;

means coupled to said source for deriving first and second light beams that are in phase and of substantially the same intensity, said second light beam being a second light component;

frequency shifting means for shifting the frequency of light beams passing therethrough in either of two opposite directions;

a sensing coil with opposite ends;

means for directing said first light beam through said frequency shifting means to generate a first light component and for then directing said first component into one end of said coil, and for directing said second light component to said second end of said coil;

means for controlling the frequency produced by said frequency shifting means so that said components, after each passes through said coil and frequency shifting means, are in a constant phase relationship;

a photodetector;

means for deriving first and second subcomponents of light which respectively include portions of said first and second components and combining them onto said photodetector, whereby to generate a photodetector output whose frequency is proportional to the frequency shift produced by said frequency shifting means.

3. The gyroscope described in claim 2 including:

a beamsplitter which has first and second inputs and first and second outputs, said splitter passing inputs to its first and second inputs respectively to its first and second outputs without relative phase changes, but said splitter passing inputs to its first and second inputs respectively to its second and first outputs with a −90° phase change;

means for directing said first and second components respectively into said first and second beamsplitter inputs;

first and second photodetectors respectively coupled to said first and second outputs of said beamsplitter, each photodetector having an electrical output;

means coupled to said first and second photodetectors for generating a beat every time the outputs of said photodetectors are of the same level.

4. The gyroscope described in claim 2 including:

means for intermittently shifting one of said subcomponents by 90° and detecting the resulting change in photodetector output;

means for sensing the derivative of the output of said photodetector near but at a time different from the time when said intermittently shifting means shifts a component by 90°;

means responsive to said means for detecting the resulting change in photodetector output when a subcomponent is shifted 90°, and to said derivative sensing means, for generating a signal representing the direction of rotation of said sensing coil.

5. A method for use with a phase nulling optical gyroscope which changes the frequency of light passing in a first direction toward a first end of a sensing coil to produce a first light component entering said first coil end, while not affecting a second light component passing toward a second end of the coil until the second component has passed through the coil at which time the second component undergoes the same frequency change, where the phase shifter produces a frequency shift in an amount which results in the offset of any phase shift caused by sensing coil rotation, the improvement for sensing coil rotation comprising:

directing a portion of said first light component which has undergone a frequency shift but not entered said sensing coil onto a photodetector, and directing a portion of said second light component which has not undergone a frequency shift and which has not entered said sensing coil onto said photodetector, whereby to obtain an output whose frequency is proportional to the rotation rate of the sensing coil.

6. The method described in claim 5 wherein:

said step of directing includes intermittently phase shifting a portion of one of said components by an absolute value of 90° and comparing the change in photodetector output due to the 90° shift with the slope of the photodetector output at about the same time as the 90° shift.

7. In an optical gyroscope which includes means for deriving a pair of light components of a coherent light beam and passing them in opposite directions around an optic fiber loop, said deriving means including a frequency shifter on a first side of the optic fiber loop that produces a frequency shift in light passing therethrough, in an amount that cancels the relative phase shift of the light components arising from rotation of the optic fiber loop, the improvement of means for detecting the frequency shift which produced the cancellation comprising:

means for producing a first subcomponent of light which has passed through said frequency shifter but not said loop and a second subcomponent of light which has not passed through said frequency shifter or said loop and with one of said subcomponents alternately phase shifted by 0° and 90° but the other not alternately shifted by 0° and 90°;

means for alternately generating 0° and 90° phase-shifted subcomponents parts of light from both said first and second subcomponents;

a pair of photodetectors;

means for directing a 0° shifted first light subcomponent part and a 90° shifted second light subcomponent part onto said first photodetector;

means for directing a 90° shifted first subcomponent part and a 0° shifted second light subcomponent part onto said second photodetector; and means for comparing the outputs of said first and second photodetectors and generating a signal whenever said outputs are equal.

8. In an optical gyroscope which includes means for deriving a pair of light components of a coherent light beam and passing them in opposite directions around an optic fiber loop, said deriving means including a frequency shifter on a first side of the optic fiber loop that produces a frequency shift in light passing therethrough, in a amount that cancels the relative phase shift of the light components arising from rotation of the optic fiber loop, the improvement of means for detecting the frequency shift which produced the cancellation comprising:

a photodetector, and means for combining onto said photodetector, light from opposite sides of said optic fiber loop, including light on said first side that has passed through said frequency shifter but not said loop, and light on the other side which has not passed through said frequency shifter or said loop;

said light on said first side and said light on said other side, which are combined by said means for combining, comprise first and second subcomponents respectively, and including second means for intermittently adding a phase shift of an absolute value of 90° to one of said subcomponents but not the other; and means responsive to the direction of change of the output of said photodetector when said means adds a 90° phase shift, and to the direction of the slope of the detector output during a period when the second means does not add a phase shift, for generating a signal representing the direction of rotation of said optic fiber loop.

* * * * *